US007743095B2

(12) United States Patent
Goldberg et al.

(10) Patent No.: US 7,743,095 B2
(45) Date of Patent: Jun. 22, 2010

(54) DEVICE, METHOD AND COMPUTER PROGRAM PRODUCT FOR PROVIDING AN ALERT INDICATION

(75) Inventors: Itzhack Goldberg, Hadera (IL); Boaz Mizrachi, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 11/926,198

(22) Filed: Oct. 29, 2007

(65) Prior Publication Data

US 2009/0113014 A1 Apr. 30, 2009

(51) Int. Cl.
*G06F 15/13* (2006.01)
(52) U.S. Cl. .................. 709/203; 709/201; 709/205; 709/206; 709/207; 370/352
(58) Field of Classification Search .................. 709/203, 709/204, 205, 206, 207, 201; 370/352
See application file for complete search history.

(56) References Cited

U.S. PATENT DOCUMENTS

| 6,301,609 | B1 | 10/2001 | Aravamudan et al. |
| 6,854,007 | B1* | 2/2005 | Hammond .................. 709/206 |
| 2004/0186886 | A1 | 9/2004 | Galli et al. |
| 2004/0260771 | A1 | 12/2004 | Gusler et al. |
| 2005/0091380 | A1* | 4/2005 | Gonen et al. ................ 709/227 |
| 2005/0138108 | A1* | 6/2005 | Galvin et al. ............... 709/201 |
| 2005/0165893 | A1* | 7/2005 | Feinberg et al. ............ 709/205 |
| 2005/0223075 | A1 | 10/2005 | Swearingen et al. |
| 2006/0155813 | A1 | 7/2006 | Dietz et al. |
| 2008/0019353 | A1* | 1/2008 | Foote ........................ 370/352 |

OTHER PUBLICATIONS

Yahoo! Messenger, "Stealth Settings and Privacy", 2007 Source: http://messenger.yahoo.com/stealth.php.
K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.

* cited by examiner

*Primary Examiner*—Jinsong Hu

(57) ABSTRACT

A method for providing an alert indication, the method includes: allowing a first user to define an alert to be generated in response to an availability of a second user to participate in an instant messaging session; and sending to the second user an alert indication indicative of the alert.

9 Claims, 10 Drawing Sheets

400

Instant messaging server 200

Instant message application instance 202

Instant message application instance 204

Prior Art

Figure 2

DEVICE, METHOD AND COMPUTER PROGRAM PRODUCT FOR PROVIDING AN ALERT INDICATION

FIELD OF THE INVENTION

The present invention relates to a method, a device and a computer program product for providing an alert indication and especially for providing an alert indication in an instant messaging system.

BACKGROUND OF THE INVENTION

In most instant messaging systems, the availability of a particular user to participate in an instant messaging session (also referred to as "activity status" or "availability status") is reflected to other users of an instant messaging system by associating one of many variable status values with the user account. These status values assist other users in assessing whether it is possible for the other users to initiate an instant messaging session with the given user. For example, an "offline" status shows that a given user is not logged onto the system, thereby informing other users that any attempt to initiate an instant messaging session with the given user would be futile. An "online" status shows that a user is logged onto the system, and other users may assume that they are likely to get a response when they initiate an instant messaging session with the given user.

In some cases, an instant messaging system automatically assigns a certain status value to a user, and this automatic assignment of status can be very helpful in facilitating communication between users. For example, in most instant messaging applications, a user is given the ability to maintain a buddy list. A buddy is another user of the instant messaging application with which the user often exchanges instant messages. The instant messaging system might automatically assign a user an "online" status value when the user logs onto the system. At the same time, a buddy list typically actively displays the status of each buddy. By displaying the buddy list in an open window of a client device, a user has the ability to easily monitor the online status of the user's buddies; when the user notices that a particular buddy's status has changed from "offline" to "online", the user can quickly initiate an instant messaging session with that particular buddy. In some instant messaging systems, an automatic assignment of status is only performed when the user has not previously designated an alternative status; in many cases, the user is able to override an automatically assigned status value by changing it to some other status value.

Although the indication of user status can be helpful in facilitating communication between users, it can also be disruptive to a user's productivity by distracting a user from other activities. Hence, many instant messaging systems allow a user to manually select from several possible status values. In some cases, various privacy-related status values can be selected that control whether other users are informed of a given user's current status. These status values restrict the other users from knowing the true status of the given user, thereby prohibiting those users from beginning an instant message conversation with the given user. For example, an "invisible" status hides a user's status from other users.

In other cases, various privacy-related status values can be selected that inform other users of the likelihood that they will be able to initiate an instant messaging session with a given user. For example, a "busy" status indicates that the given user is currently doing some other activity, while a "be right back" status would indicate to other users that the given user is temporarily away from his or her computer. As another example, a "do not disturb" status would indicate to other users that are interested in the given user's status that the given user does not want to be interrupted by instant messaging sessions. During any period in which the user has one of these status values, though, the user is able to monitor the status of other users or to have the ability to start instant messaging sessions with other users.

With reference now to the figures, FIG. 1A depicts a prior art network of data processing systems that can support instant messaging. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

Distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), Common Presence and Instant Messaging (CPIM) protocols, etc. Of course, distributed data processing system 100 may also include a number of different types of networks, such as, for example, an intranet, a local area network (LAN), or a wide area network (WAN). For example, server 102 directly supports network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth wireless technology, to create so-called personal area networks (PAN) or personal ad-hoc networks. In a similar manner, PDA 113 can transfer data to PDA 107 via wireless communication link 116.

With reference now to FIG. 1B, a diagram depicts a typical computing device, such as those shown in FIG. 1A, which can facilitate instant messaging. Computing device 105 includes one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 2 may vary depending on the system implementation. For example, the system may have one or more processors, such as an Intel™ Pentium™ based processor and a digital signal processor (DSP), and one or more types of volatile and non-volatile memory.

A typical operating system may be used to control program execution within each data processing system. For example, one device may run a Unix operating system, while another device contains a simple Java runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

With reference now to FIG. 2, a block diagram depicts a typical instant messaging system. Typical instant messaging systems have characteristics of a client/server organization and a peer-to-peer organization. Instant messaging (IM) server 200 authenticates a user of an instant messaging application, such as instant message application instances 202 and 204. IM server 200 is conveniently connected to computing devices that host the instant messaging application over a network. After authenticating a user, the instant messaging server will perform certain operations on behalf of the instant messaging application. In this manner, an instance of an instant messaging application operates as an instant messaging client. The instant messaging server maintains some type of session for each active instant messaging client, which eventually logs out from the session or allows the session to undergo a timeout termination.

However, after being initialized with certain information, depending on the communication protocol, active instant messaging clients can communicate directly with each other by transferring instant messages directly to another active instant messaging client without assistance from the instant messaging server. In this manner, the separate instances of the instant messaging application act as peer nodes in a peer-to-peer network. Many instant messaging systems employ proprietary protocols, although standard instant messaging protocols have been proposed, e.g., Crocker et al., "Common Presence and Instant Messaging (CPIM)", Internet Draft of the Internet Engineering Task Force (IETF), draft-ietf-impp-cpim-03.txt, 08/2002.

For example, assuming that a user has previously registered for an account with the instant messaging server, a user logs into the instant messaging server through an instant messaging application on a client device. The instant messaging server stores the connection information for the client device, such as the IP address of the client device and the port number that is assigned to the instant messaging application at the client device.

During the login operation, the instant messaging server also receives and stores an IM contact list, often referred to as a buddy list, for the user along with the user's connection information and other session information. The server performs an initial check to obtain the status of the users in the buddy list and notifies the user's active instant messaging client of the status of those users, e.g., whether those users are online and available for communication through the instant messaging system. The server monitors these buddy lists such that when a user logs into the instant messaging system, the server notifies anyone who has the recently logged-in user within a buddy list that the recently logged-in user is now online or is associated with some other type of status.

Assuming that a buddy has not chosen to remain cloaked within an "invisible" status, when the instant messaging server notifies a first instant messaging client that a second instant messaging client is online, the instant messaging server sends the connection information for the second instant messaging client to the first instant messaging client and perhaps vice versa depending upon the online status of the user. Because each active instant messaging client has connection information for other active instant messaging clients in the instant messaging system, these instant messaging clients can transfer instant messages between themselves without interaction with the instant messaging server, i.e. in a peer-to-peer manner.

A certain user can define one or more alerts to be generated in response to an availability of another user to participate in an instant messaging session. Thus, if the other user becomes available, becomes unavailable, goes offline, and the like, the certain user can receive an alert.

FIG. 3 illustrates a typical prior art graphical user interface window 201 for defining an alert. Window 201 is presented on a display device connected to a data processing system on which an instance of an instant messaging application is executing for a user. In a typical fashion for an instant messaging application, window 201 contains several user interface controls for defining the alert. Drop-down menu 203 contains the event (related to the availability of the other user) that shall trigger the alert. Area 205 (which is currently empty) should list previously defined alerts. Typically, each alert is defined by the name of the event that should trigger the alert, recurrence information and optional notes.

Next button 207 and back button 209 are used for scrolling between different windows of the instant messaging application GUI windows. Cancel button 210 is used to cancel a definition of an alert.

The other user is not aware of the alert that is defined by the certain user. This asymmetry can lead to unpleasant situations.

There is a growing need to provide a more symmetrical instant messaging system.

SUMMARY OF THE PRESENT INVENTION

A method for providing an alert indication, the method includes: allowing a first user to define an alert to be generated in response to an availability of a second user to participate in an instant messaging session; and sending to the second user an alert indication indicative of the alert.

Conveniently, the method includes allowing the first user to prevent the sending of the alert indication to the second user.

Conveniently, the method includes allowing the first user to prevent a generation of the alert indication.

Conveniently, the method includes sending to the first user an alert awareness indication indicative of an awareness of the second user to the alert.

Conveniently, the method includes allowing the second user to prevent the first user from setting up the alert.

Conveniently, the method includes allowing the second user to prevent predefined amount of attempts of the first user to set up the alert.

Conveniently, the allowing includes allowing the first user to define different alerts to be generated in response to different availability levels of the second user.

BRIEF DESCRIPTION OF THE DRAWINGS

The present invention will be understood and appreciated more fully from the following detailed description taken in conjunction with the drawings in which:

FIG. 2 illustrates a prior art instant messaging system;

DETAILED DESCRIPTION OF THE DRAWINGS

The present invention provides an observer feature. A first user (trapper) can define an alert to be generated in response to an availability of a second user (trappee) to participate in an instant messaging session. The second user receives an alert indication indicative of the alert. Thus, the second user is provided with an observer capability.

The present invention may be implemented on a variety of hardware and software platforms. It may be implemented on the platforms described in FIGS. 1, 2 and 2, but this is not necessarily so. More specifically, though, the present invention is directed to operating an instant messaging system, as described in more detail below with respect to the remaining figures. It should be noted that the examples that are described hereinbelow often refer to users and systems. It should be understood that a user interacts with a system such that the system performs actions on behalf of a user, and the terms "user" and "system" can sometimes be interchanged in a well-known manner to facilitate the description of operations at a data processing system.

Figure 4:
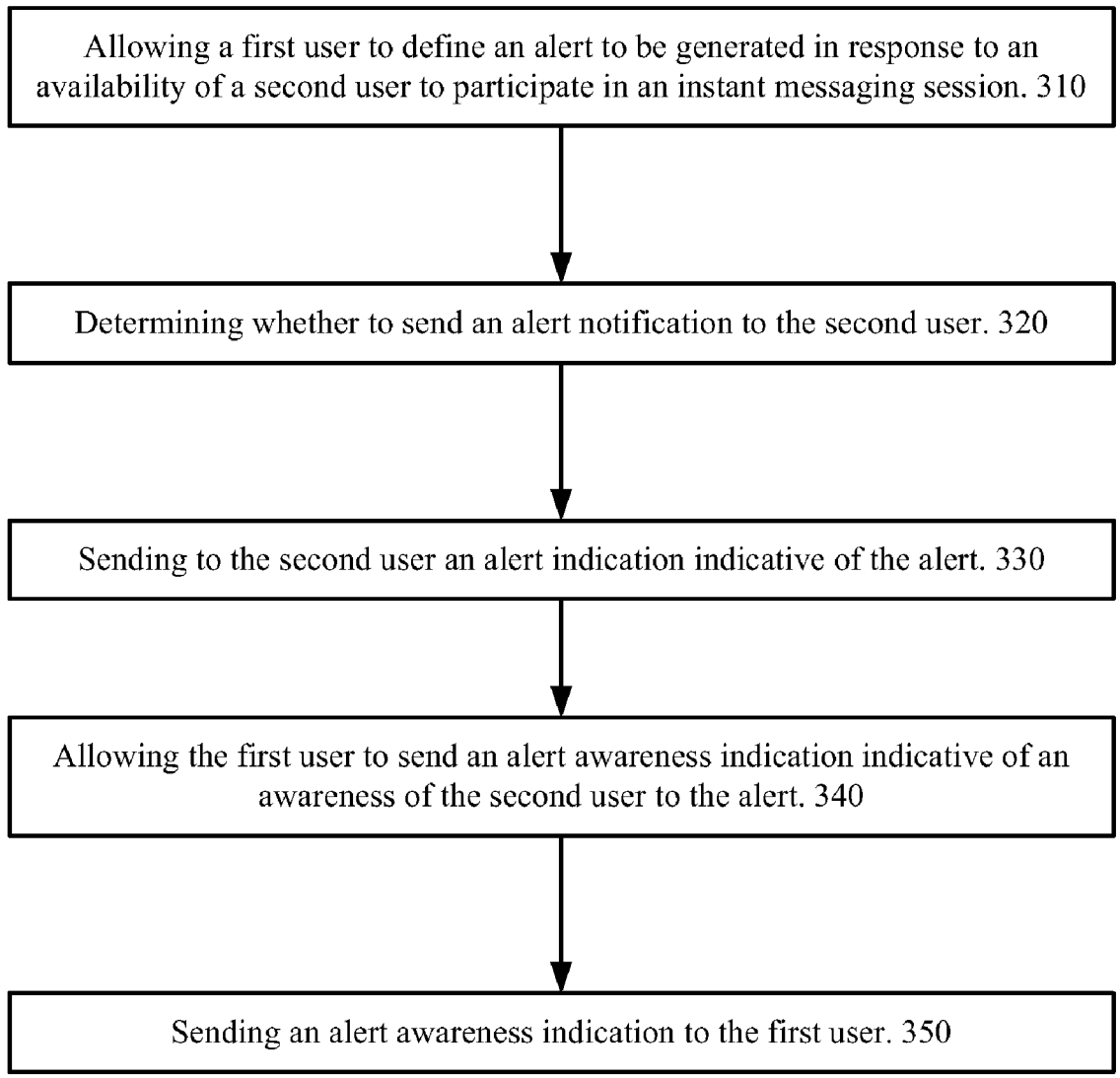
FIG. 4 is a flow chart of a method for providing an alert indication according to an embodiment of the invention.

FIG. 4 is a flow chart of method 300 for providing an alert indication according to an embodiment of the invention.

Method 300 starts by stage 310 of allowing a first user to define an alert to be generated in response to an availability of a second user to participate in an instant messaging session. Stage 310 may include receiving a request from the first user to define the alert. The alert details and especially the identity of the second user and the event (related to the availability of the second user) that should trigger the alert can be received by using a GUI.

Conveniently, stage 310 includes allowing the first user to define different alerts to be generated in response to different availability levels of the second user.

Conveniently, stage 310 also involves allowing a user to enable a generation of an alert notification and enable sending the alert notification to the second user. The alert notification is indicative of the alert that is defined by the first user.

According to an embodiment of the invention the first user can select to prevent the generation of the alert indication, and additionally or alternatively, the sending of the alert notification to the second user. Accordingly, stage 310 may include allowing the first user to prevent the sending of the alert indication to the second user. Additionally or alternatively, stage 310 may includes allowing the first user to prevent a generation of the alert indication.

Figure 5:
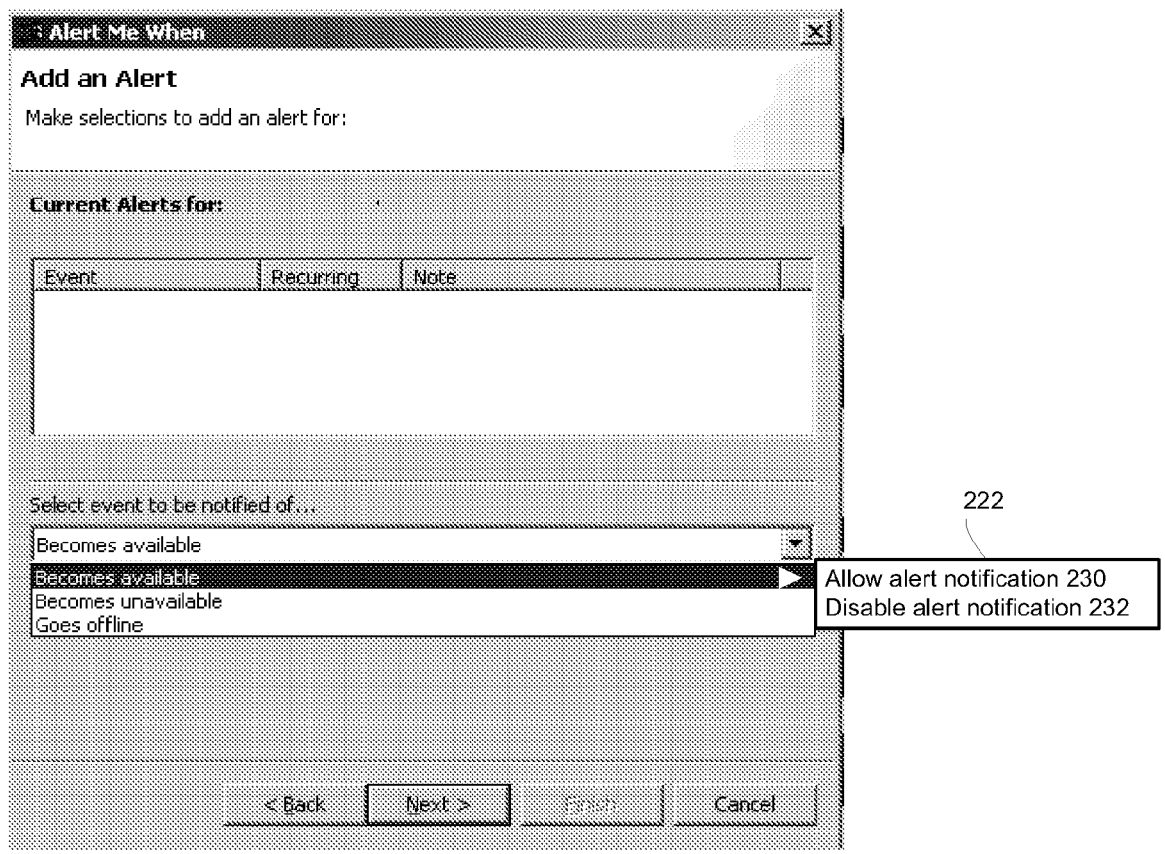
FIG. 5 illustrates a graphical user interface window for defining an alert and selectively enabling a provision of an alert notification according to an embodiment of the invention.

FIG. 5 illustrates graphical user interface window 220 for defining an alert and selectively enabling a provision of an alert notification according to an embodiment of the invention. Window 220 differs from prior art window 201 by including menu 222 that enables the first user to select between sending to the second user an alert indication (represented by "allow alert notification" 230) and between not sending (or not generating such an alert indication (represented by "disable alert notification" 232).

According to an embodiment of the invention the latter option is the default—for providing backward compatibility.

According to another embodiment of the invention the default (or alternatively—the only option presented to the first user) is to generate and send to the second user the alert indication.

Stage 310 is followed by stage 320 of determining whether to send an alert notification to the second user. If the sending (or generating) of the alert notification is not prevented during stage 310 then stage 320 is followed by stage 330 of sending to the second user an alert indication indicative of the alert.

According to an embodiment of the invention stage 330 is followed by stage 340 of allowing the first user to send an alert awareness indication indicative of an awareness of the second user to the alert.

Figure 6:
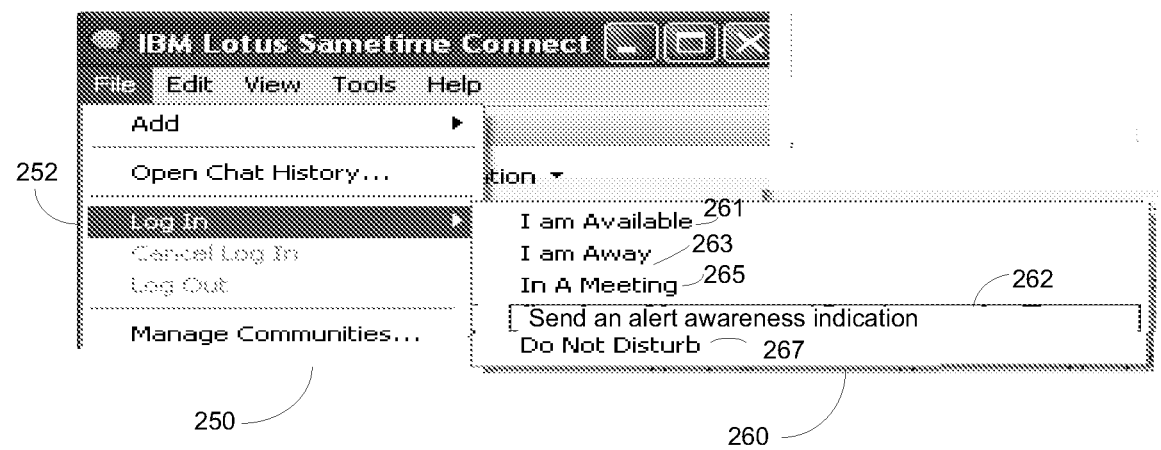
FIG. 6 illustrates a graphical user interface window for enabling a transmission of an alert awareness indication according to an embodiment of the invention.

FIG. 6 illustrates graphical user interface window 240 for enabling a transmission of an alert awareness indication according to an embodiment of the invention. Window 240 illustrates two menus 250 and 260.

The user selected "log in" menu item 252 (of menu 250) that allows the second user to log in. This selection also opened menu 260 that allows the second user to send an alert acknowledgement, by selecting "send alert awareness indication" menu item 262. It is noted that other menu items of menu 260 provide an indication about the availability of the second user to participate in an instant messaging session (see: "I am available" menu item 261, "I am away" menu item 263, "In a meeting" menu item 265 and "do not disturb" menu item 267).

Assuming that the second user selected to send such an alert awareness indication then stage 340 is followed by stage 350 of sending an alert awareness indication to the first user.

According to various embodiments of the invention the second user can prevent the first user from defining an alert to be generated in response to an availability of the second user to participate in an instant messaging session. The second user can temporarily prevent the first user from defining such an alert, can permanently prevent the first user from defining such an alert, can prevent only certain types of alerts (triggered by predefined events), and the like.

Figure 7:
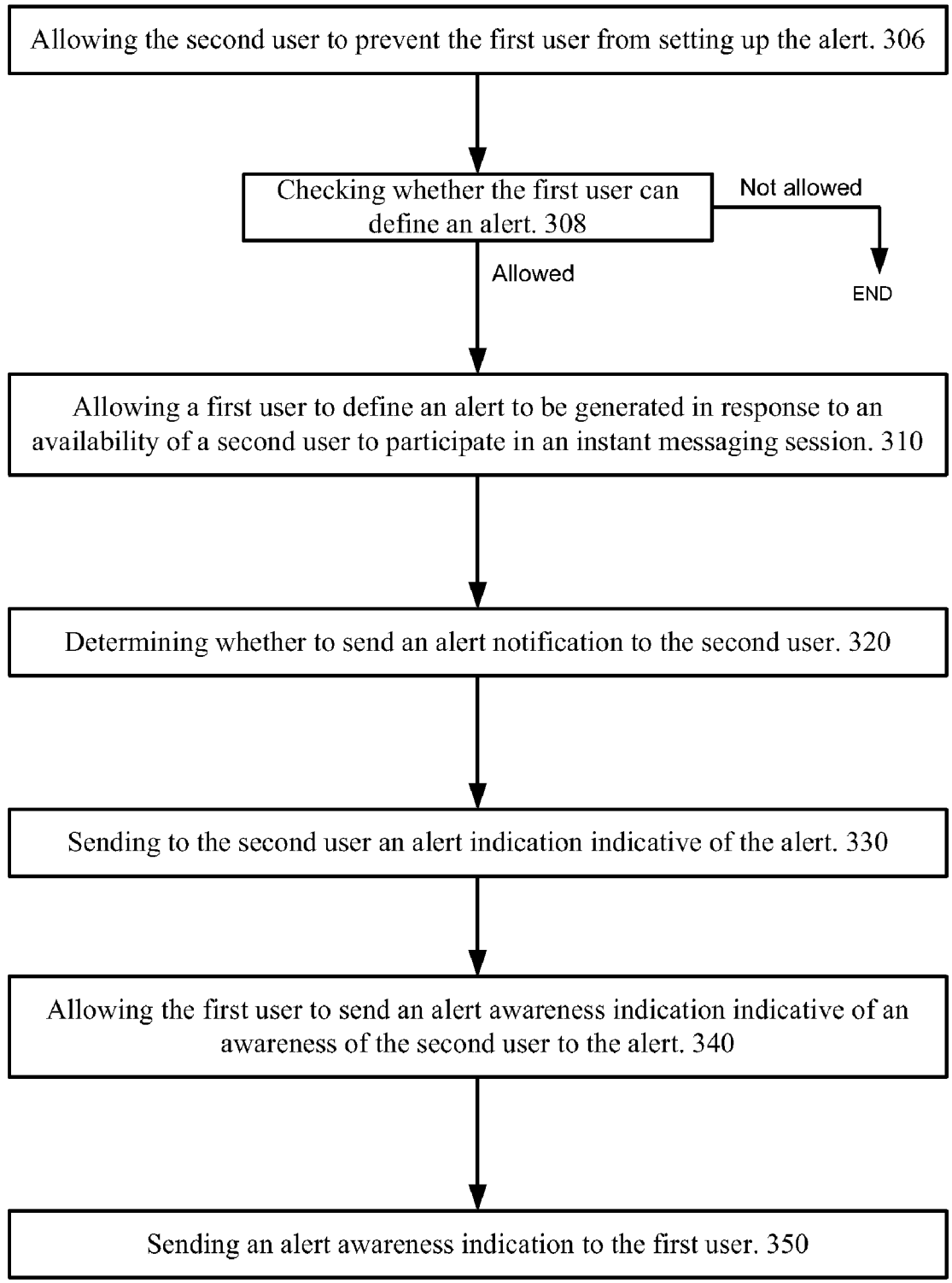
FIG. 7 illustrates a flow chart of a method for providing an alert indication according to an embodiment of the invention.

FIG. 7 illustrates a flow chart of method 302 for providing an alert indication according to an embodiment of the invention.

Method 302 differs from method 300 by including stages 306 and 308 that precede stage 310.

Stage 306 includes allowing the second user to prevent the first user from setting up the alert. It is noted that stage 306 can allowing temporary prevention, permanent preventions, and the like. A temporary prevention can be defined by a time period, by number of alert definitions attempts or a combination thereof.

Figure 8:
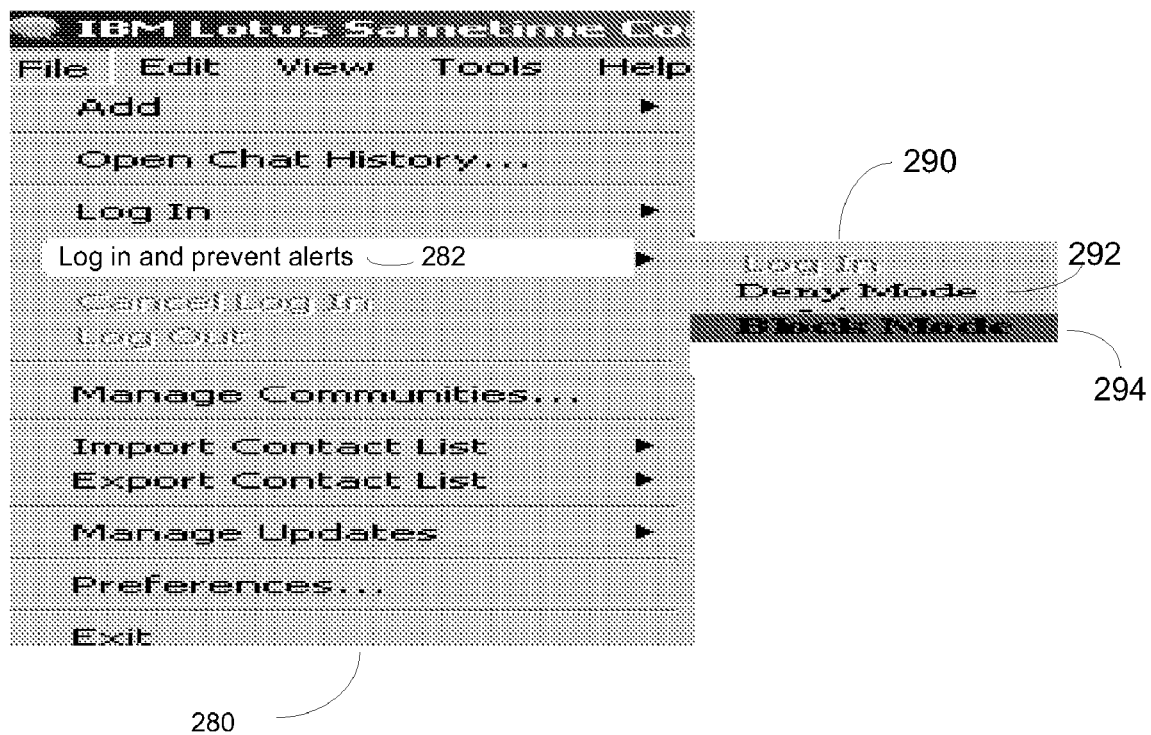
FIG. 8 illustrates a graphical user interface window for preventing a second user from defining an alert according to an embodiment of the invention.

FIG. 8 illustrates graphical user interface window 270 for preventing a second user from defining an alert according to an embodiment of the invention.

Window 270 illustrates menus 280 and 290.

It is assumed that the second user selects "log in and prevent alerts" menu item 282 (of menu 280) that allows the second user to log in and define which users (such as the first user) should be prevented from defining alerts related to the second user.

This selection also opened menu 290 that allows the second user to add a user (such as the first user) to a permanently prevented users list (also referred to as a blocked users list). The addition can be made by selecting "block mode" menu item 292 (of menu 290). It is noted that the blocked users list can be amended in other manners.

Menu 290 also allows the second user to add or remove a user (such as the first user) to a temporarily prevented users list (also referred to as a denied users list). The addition can be made by selecting "deny mode" menu item 294 (of menu 290). It is noted that the denied users list can be amended in other manners.

It is noted that the denied user list and the blocked user list can be displayed to the user in various manners.

Stage 306 is followed by stage 308 of checking whether the first user can define an alert. The checking may involve scanning second user databases that include users that are prevented from defining an alert. If the answer is positive then stage 308 is followed by stage 310, else the process ends.

Figure 9:
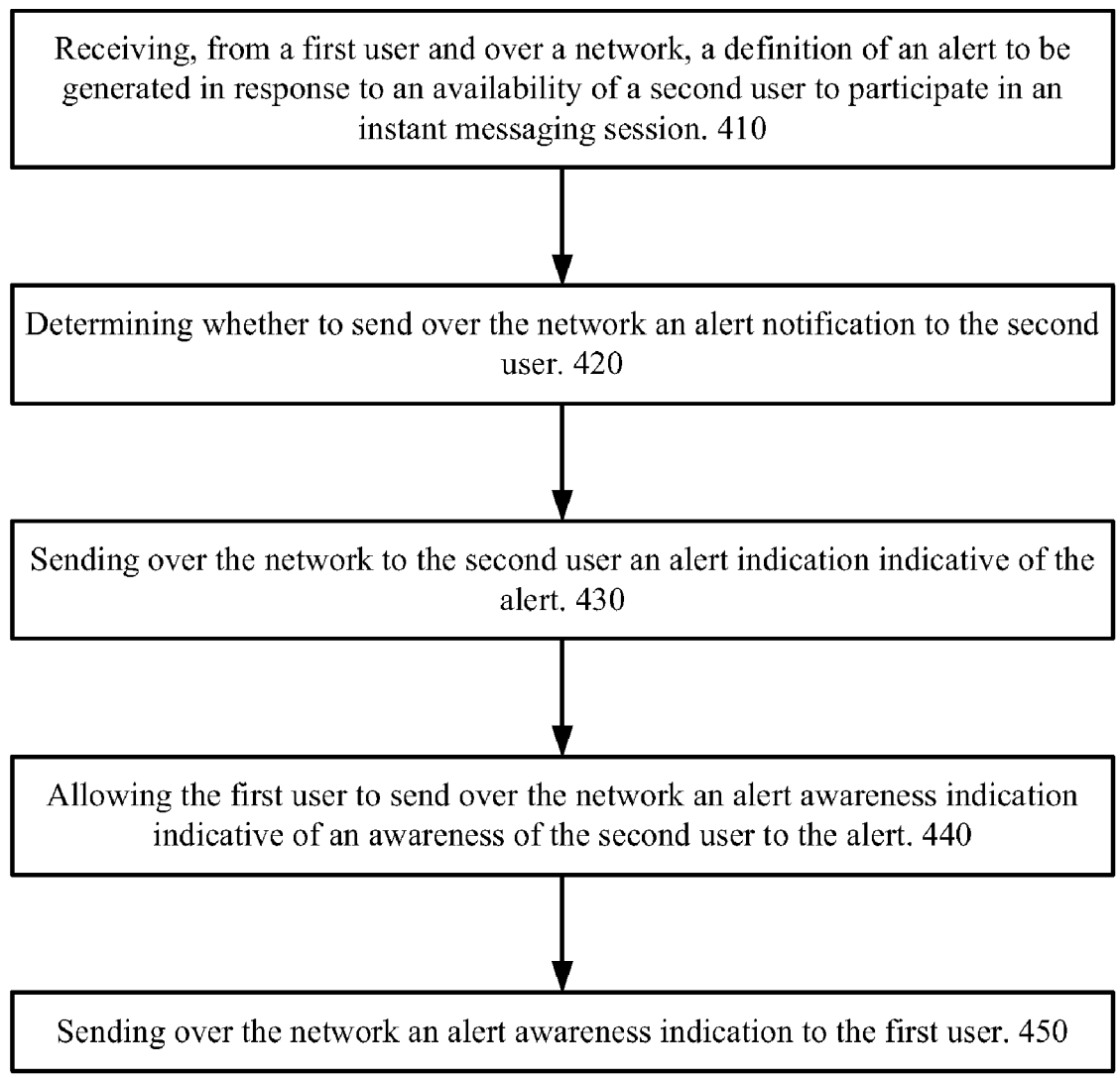
FIG. 9 is a flow chart of a method for providing a service over a network according to an embodiment of the invention.

FIG. 9 is a flow chart of method 400 for providing a service over a network according to an embodiment of the invention.

Method 400 starts by stage 410 of receiving, from a first user and over a network, a definition of an alert to be generated in response to an availability of a second user to participate in an instant messaging session.

Conveniently, stage 410 includes receiving from the first user different definitions of alerts to be generated in response to different availability levels of the second user.

Conveniently, stage 410 also involves receiving, from the first user and over the network, a request to generate an alert notification and to enable sending over the network the alert notification to the second user. The alert notification is indicative of the alert that is defined by the first user.

Figure 1A:
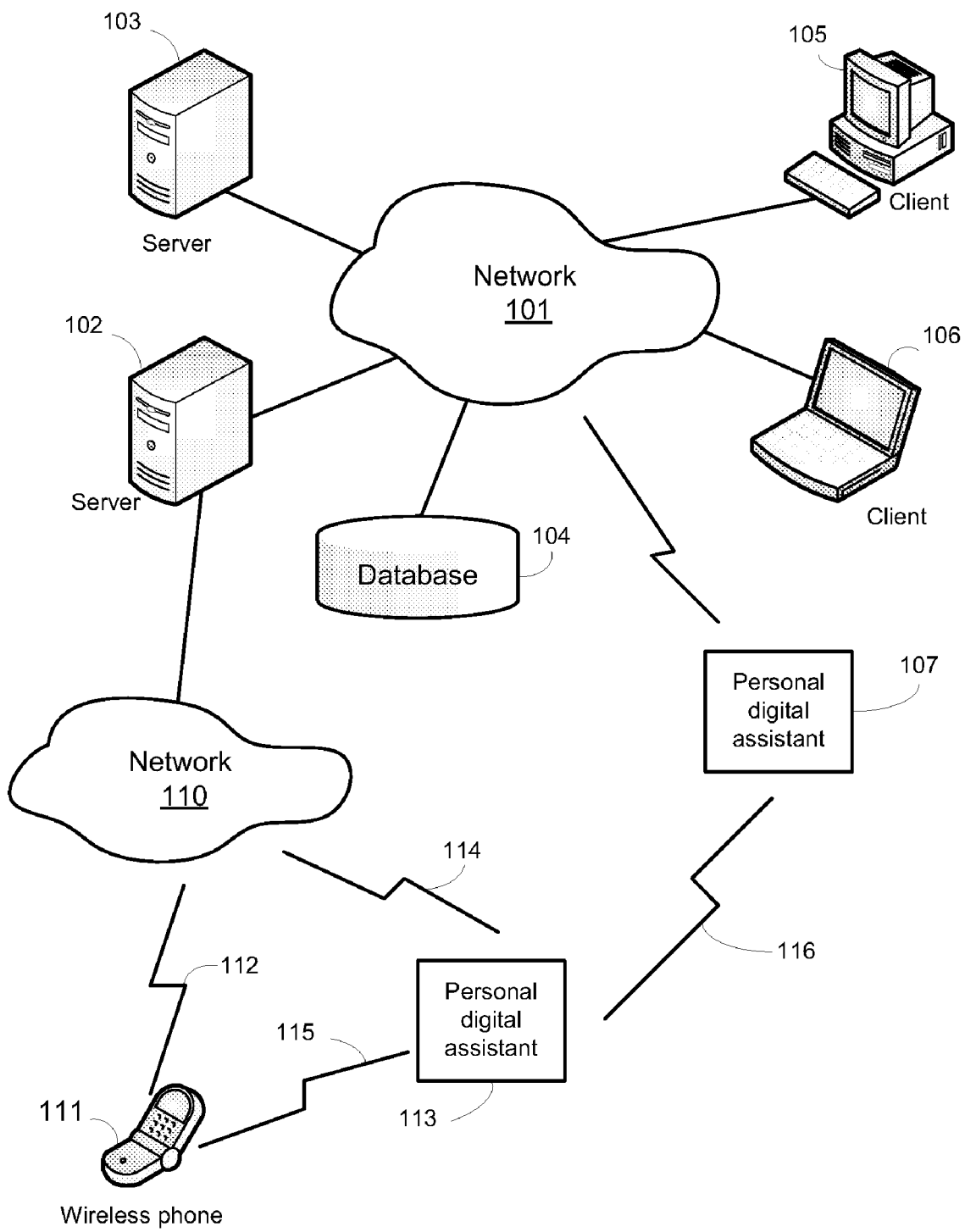
FIG. 1A depicts a prior art network of data processing systems that can support instant messaging.
Figure 1B:
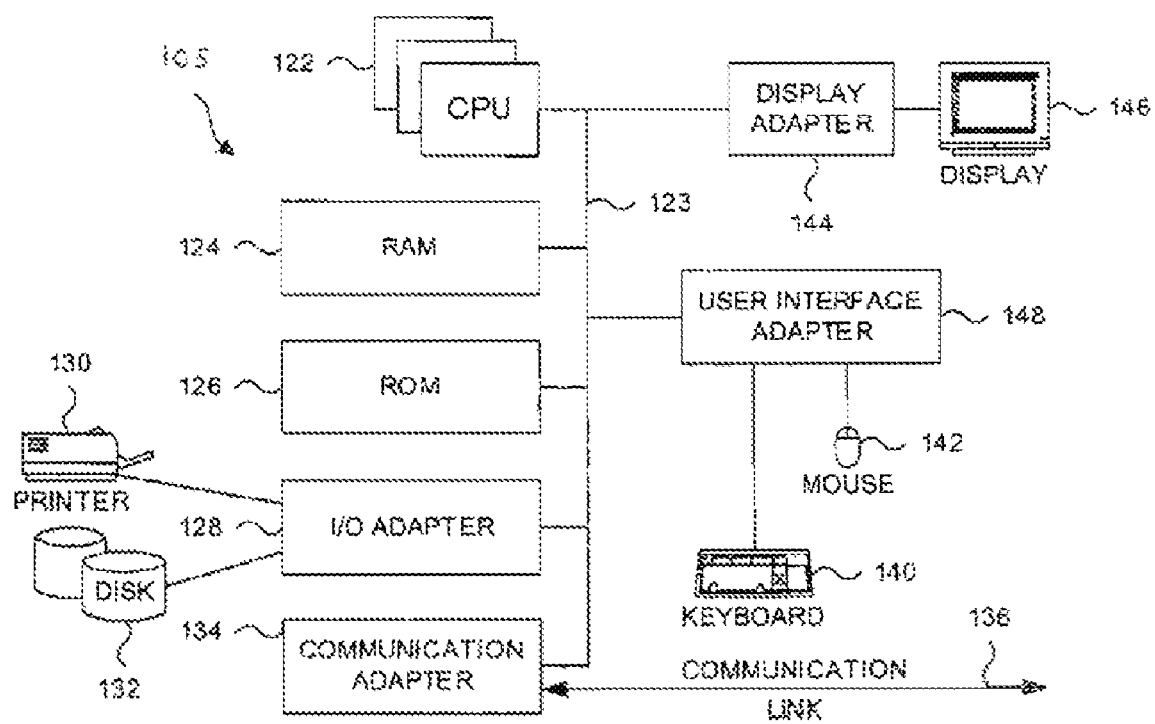
FIG. 1B is a diagram depicts a prior art computing device.
Figure 3:
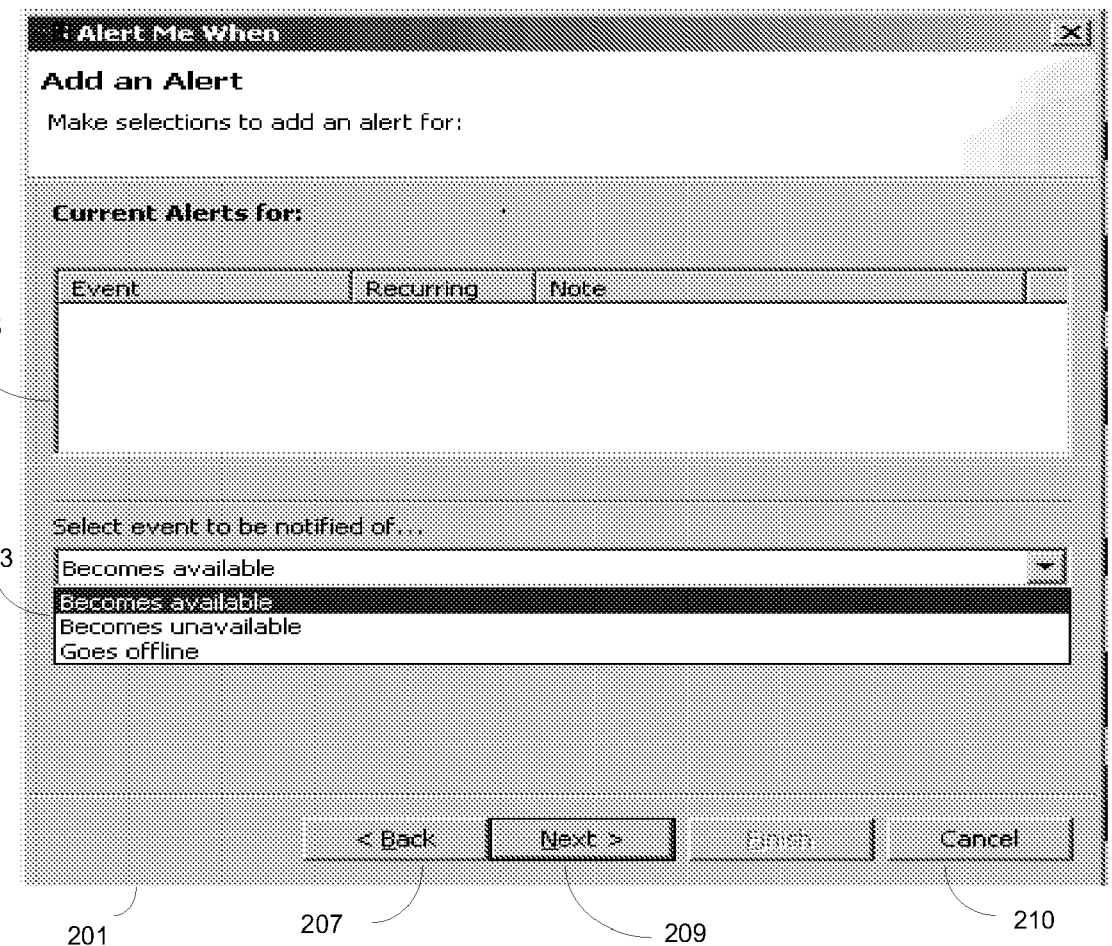
FIG. 3 illustrates a typical prior art graphical user interface window for defining an alert.

Referring to the example set fourth in FIG. 1A, the network can be network 101, network 110 or a combination thereof.

According to an embodiment of the invention the first user can select to prevent the generation of the alert indication, and additionally or alternatively, the sending over the network of the alert notification to the second user. Accordingly, stage 410 may include receiving a request over the network and from the first user to prevent the sending of the alert indication to the second user. Additionally or alternatively, stage 310 may include receiving a request over the network and from the first user to prevent the generation of the alert indication to the second user Stage 410 is followed by stage 420 of determining whether to send over the network an alert notification to the second user. If the sending (or generating) of the alert notification is not prevented during stage 410 then stage 420 is followed by stage 430 of sending over the network to the second user an alert indication indicative of the alert.

According to an embodiment of the invention stage 430 is followed by stage 440 of allowing the first user to send over the network an alert awareness indication indicative of an awareness of the second user to the alert.

Assuming that the second user selected to send such an alert awareness indication then stage 440 is followed by stage 450 of sending over the network an alert awareness indication to the first user.

According to various embodiments of the invention the second user can prevent the first user from defining an alert to be generated in response to an availability of the second user to participate in an instant messaging session. The second user can temporarily prevent the first user from defining such an alert, can permanently prevent the first user from defining such an alert, can prevent only certain types of alerts (triggered by predefined events), and the like.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Conveniently, a computer program product is provided. The computer program product includes a computer usable medium that includes a computer readable program, wherein the computer readable program when executed on a computer causes the computer to: receive from a first user a definition of an alert to be generated in response to an availability of a second user to participate in an instant messaging session; and send to the second user an alert indication indicative of the alert.

The computer readable program can cause the computer to execute one or more states of any method out of methods 300, 302 and 400.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for providing computer network users with information regarding other computer network users, the method comprising:

receiving a request from a first computer network user to receive a notification regarding the availability of a second computer network user to communicate via a computer network;

receiving a request from said second computer network user to receive a notification regarding any computer network user that requests to receive a notification regarding the availability of said second computer network to communicate via said computer network; and sending a notification to said second computer network user indicating that said first computer network user has requested to receive said notification regarding the availability of said second computer network user to communicate via said computer network, wherein said receiving and sending steps are implemented in either of
  a) computer hardware configured to perform said steps, and
  b) computer software embodied in a tangible, computer-readable storage medium.

2. The method according to claim 1 further comprising receiving a request from said first computer network user to prevent the sending to said second computer network user said notification regarding any computer network user that requests to receive a notification regarding the availability of said second computer network to communicate via said computer network.

3. The method according to claim 1 further comprising receiving a request from said second computer network user to prevent the fulfillment of said request by said first computer network user to receive said notification regarding the availability of said second computer network user to communicate via said computer network.

4. A computer program product comprising a computer readable storage medium including a computer readable program, wherein the computer readable program when executed on a computer causes the computer to:
  receive a request from a first computer network user receive a notification regarding the availability of a second computer network user to communicate via a computer network;
  receive a request from said second computer network user to receive a notification regarding any computer network user that requests to receive a notification regarding the availability of said second computer network to communicate via said computer network; and
  send a notification to said second computer network user indicating that said first computer network user has requested to receive said notification regarding the availability of said second computer network user to communicate via said computer network.

5. The computer program product according to claim 4, wherein the computer readable program when executed on a computer causes the computer to receiving a request from said first computer network user to prevent the sending to said second computer network user said notification regarding any computer network user that requests to receive a notification regarding the availability of said second computer network to communicate via said computer network.

6. The computer program product according to claim 5, wherein the computer readable program when executed on a computer causes the computer to prevent the fulfillment of said request by said first computer network user to receive said notification regarding the availability of said second computer network user to communicate via said computer network.

7. A system for computer network users with information regarding other computer network users, the system comprising:
  a memory unit; and
  a processor,
    wherein the memory unit is adapted to store a request received from a first computer network user to receive a notification regarding the availability of a second computer network user communicate via a computer network, and a request from said second computer network user to receive a notification regarding any computer network user that requests to receive a notification regarding the availability of said second computer network to communicate via said computer network, and
    wherein the processor is adapted to send a notification to said second computer network user indicating that said first computer network user has requested to receive said notification regarding the availability of said second computer network user to communicate via said computer network.

8. The system according to claim 7 wherein said processor is further adapted to prevent the sending to said second computer network user said notification regarding any computer network user that requests to receive a notification regarding the availability of said second computer network to communicate via said computer network.

9. The system according to claim 7 wherein said processor is further adapted to prevent the fulfillment of said request by said first computer network user to receive said notification regarding the availability of said second computer network user to communicate via said computer network.

* * * * *